June 4, 1946.  J. MIHALYI  2,401,701
RANGE FINDER
Filed Jan. 19, 1943  4 Sheets-Sheet 1
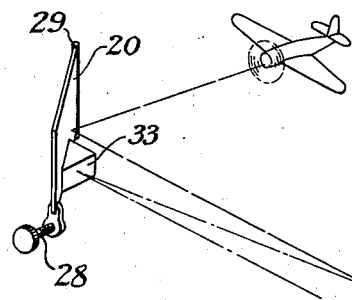
FIG. 1.
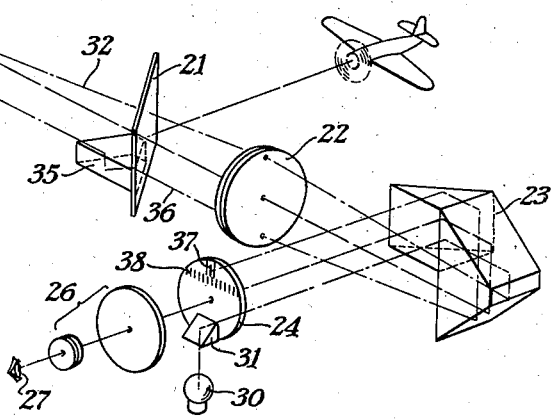
FIG. 1A.
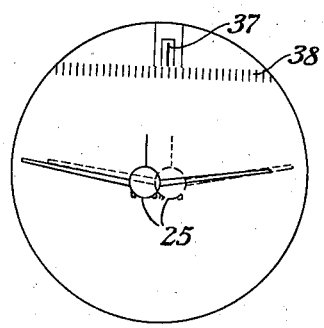
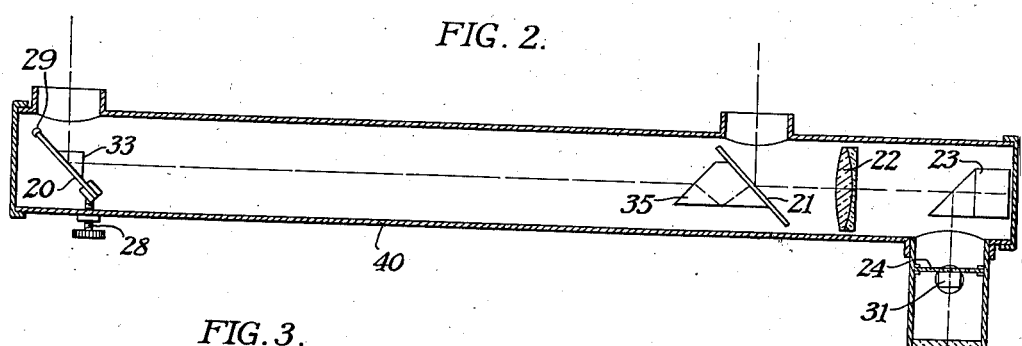
FIG. 2.
FIG. 3.
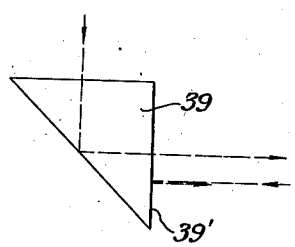
JOSEPH MIHALYI
INVENTOR
BY
ATT'Y & AG'T June 4, 1946.   J. MIHALYI   2,401,701
RANGE FINDER
Filed Jan. 19, 1943   4 Sheets-Sheet 2
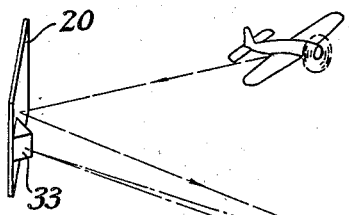
FIG. 4.
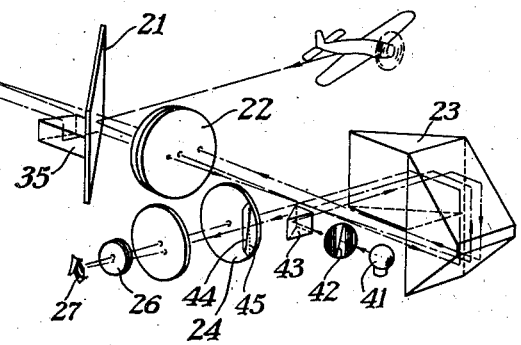
FIG. 4A.
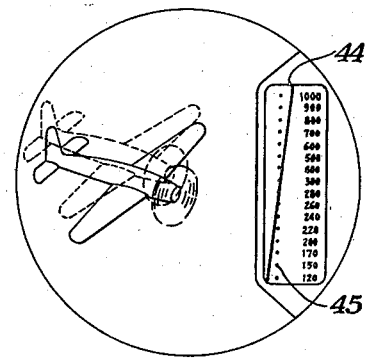
FIG. 5.
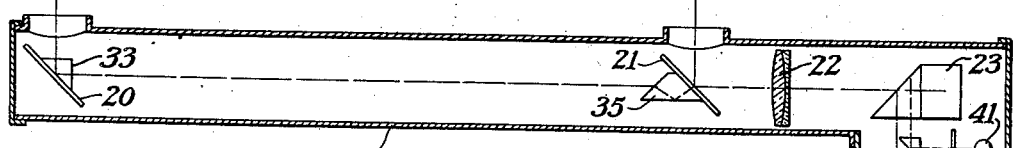
FIG. 6.
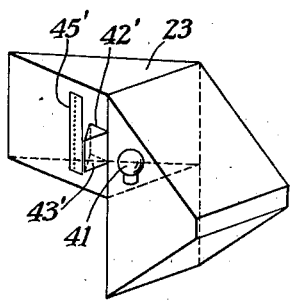
FIG. 7.
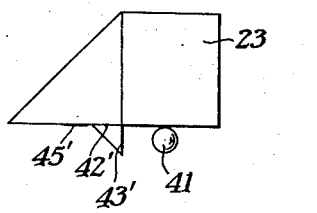
JOSEPH MIHALYI
INVENTOR
BY
ATTY & AG'T June 4, 1946.  J. MIHALYI  2,401,701
RANGE FINDER
Filed Jan. 19, 1943  4 Sheets-Sheet 3

JOSEPH MIHALYI
INVENTOR
BY
ATT'Y & AG'T

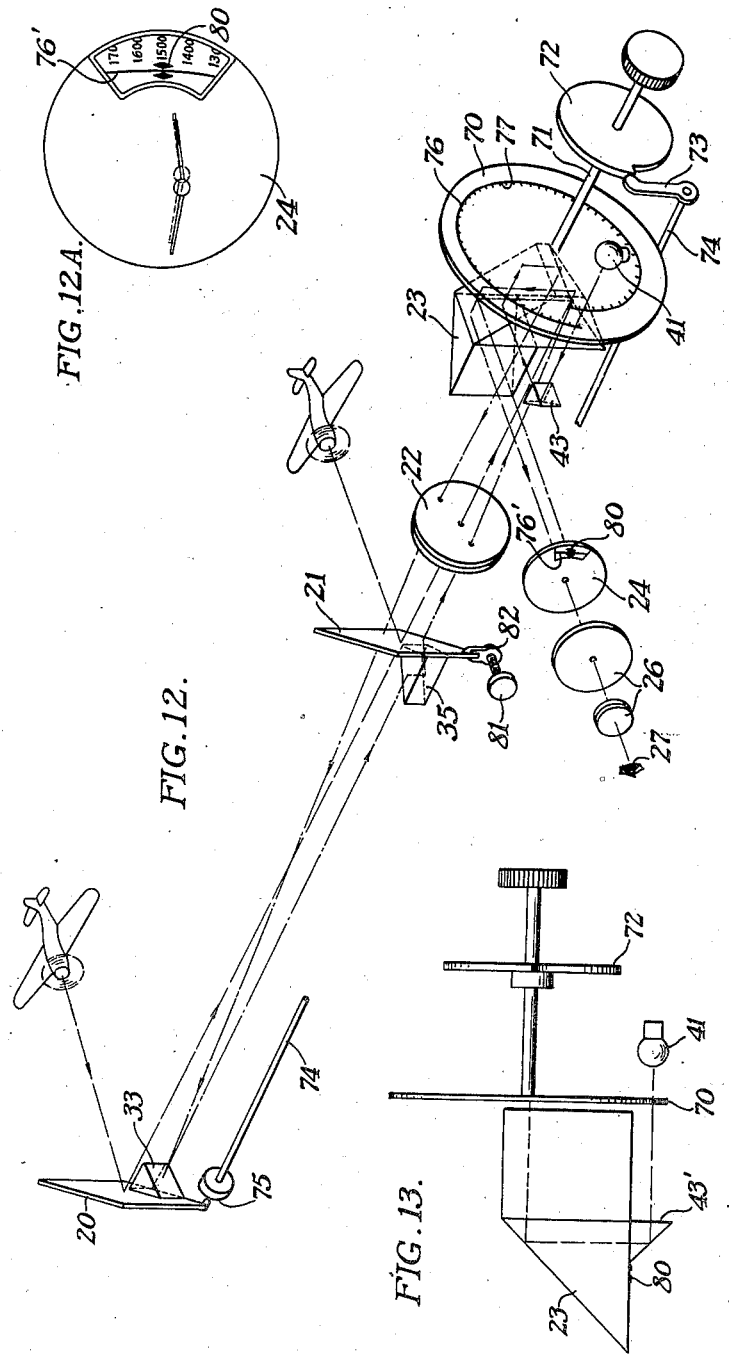

Patented June 4, 1946

2,401,701

UNITED STATES PATENT OFFICE 2,401,701

RANGE FINDER

Joseph Mihalyi, Rochester, N. Y., assignor to Eastman Kodak Company, Rochester, N. Y., a corporation of New Jersey Application January 19, 1943, Serial No. 472,832

29 Claims. (Cl. 88—2.7)

This invention relates to range finders.

This is Case B of a series of applications relating to this same subject which series includes the following:

| Title | Serial No. | Filed | Inventors |
|---|---|---|---|
| Mount for optical elements. | 461,584 | Oct. 10, 1942 | Mihalyi. |
| Range finder construction. | 461,585 | Oct. 10, 1942 | Do. |
| Range finders—Case A | 472,851 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Polarizing beam splitter. | 481,391 | Apr. 1, 1943 | MacNeille. |
| Range finders—Case M | 491,954 | June 23, 1943 | Do. |
| Range finders—Case N | 491,955 | June 23, 1943 | MacNeille, Mihalyi. |
| Range finders—Case O | 491,956 | June 23, 1943 | MacNeille. |
| Range finders—Case P | 505,116 | Oct. 5, 1943 | MacNeille, Mihalyi. |

Case A of this series relates broadly to an invention which had for its main object the reduction or elimination of errors due to maladjustment of the optical system of a range finder. The invention also provides an arrangement for viewing the range scale or its equivalent directly in the eyepiece of the range finder so as to give an automatically corrected reading while ranging and/or an indication that the instrument is in proper adjustment.

The present Case B relates to an invention having similar objects and advantages specifically with reference to unsymmetrical range finders employing but a single objective for focusing both beams from the object being ranged. This type of range finder is particularly useful as a so-called Short-base range finder. It will be noted that in addition to disclosing the broad invention, Case A specifically covered symmetrical type range finders and ortho-pseudo stereo range finders and is thus further distinguished from the present Case B.

It is also an object of the present invention to provide a greatly simplified but accurate range finder.

One particular feature of the present case, which is also useful with other species of the broad invention is an oblique scale and index arrangement described below. It is the object of this feature to give increased accuracy and increased ease of reading the range scale.

These unsymmetrical or short base range finders usually have a housing with two spaced windows in front thereof to constitute viewing points of the finder at which beams of light (called "object beams") are received from the object being ranged. A reflector is positioned behind each of the windows to reflect each beam once or one of the beams twice and to direct them into alignment which can be most accurately described as going radially away from one of the reflectors. That is, the beams are combined at a semi-reflecting surface which is one of the viewing point mirrors itself. Of course, if each of the beams is reflected once, these aligned beams are going radially away from both of the reflectors. The aligned beams are then directed through an objective which forms in a comparison field two images of the object being ranged. Erecting prisms may or may not be included in the system and, of course, since it is a coincidence range finder there is always some means for deviating one of the beams relative to the other for adjusting the register of the two images in the comparison plane. One of the simplest and most satisfactory forms of light deviating devices consists of means for rotating one of the reflectors slightly.

According to the present invention, such range finders are improved by having a pair of adjustment coincidant elements, such as a scale and index or a coincidence line and fiducial mark or both, and means for projecting light from one of the elements through at least part of the optical system of the range finder so that it is reflected at least once at each of the reflectors behind the viewing windows and is deviated by the light deviating means. This light (called the "element beam") is then brought to focus adjacent to the other adjustment coincidant element to give the range (or equivalent) automatically corrected for or indicating any maladjustment of the range finder system which might affect the relative position of the two object images. The term "reflector" is here used to refer to the whole reflecting unit behind each window; the element light beam may be reflected by the same reflecting surface of the reflector as the object beam or by a different surface of the reflector.

With this invention incorporated into a range finder providing automatically high accuracy, it is possible to use relatively simple reflectors and simple light deviating means since errors therein do not materially affect the accuracy of the instrument. Preferably the element light beam is reflected once only at each of the reflectors behind the viewing windows and convenient means for providing these reflections consist of prisms with properly oriented reflecting surfaces, cemented to and constituting part of each of the reflectors. Preferably, the adjustment coincidant elements are in, or at least optically in, the comparison field so that the single objective of the range finder serves to focus the element image as well as the object images. In the simplest form of the range finder, the adjustment coincidant elements are a scale and an index. In short base range finders in which an erecting prism is used, further simplification of the invention can be attained by having the comparison plane at one surface of this erecting prism and having the range indicating elements on this surface. At each reflector or reflecting unit, the element light beam may be reflected either by exactly the same surface as reflects the light from the object being ranged or by an auxiliary surface rigidly attached thereto. One simplified form of the invention has these auxiliary surfaces at approximately 45° to the main reflecting surface of the reflector. If the main reflecting surface is used, on the other hand, auxiliary reflectors such as penta-prisms or other optical squares must be located in front of each of the main reflectors to send the element beam from the vicinity of one window to the other. This latter form is more complicated than is usually necessary with this short base form of the invention. The adjustment coincidant element from which light is projected to the other element, may be illuminated by daylight but is preferably illuminated by a small lamp built into the range finder.

Every part of the range finder optical system which deviates or might deviate one of the object beams relative to the other, should deviate the element beam correspondingly and with equal rates of change of direction, so that any effective changes in object beam direction are accompanied by equal changes in element beam direction.

In the form of the invention in which the adjustment coincidant elements are a scale and index, a simple scale may be so compressed as to be difficult to read when viewed in the eyepiece of the instrument. According to one embodiment of the invention, this is overcome by having the index in the form of an elongated line and the scale in the form of points on a line which is preferably straight or which may be curved to give different degrees of sensitivity at different parts of the scale. These line index and elongated scale are oriented so that the image of one falling on the other forms therewith an acute angle less than 45°. As the image moves, for example as the line index moves laterally, the point of reading where the line and scale intersect moves relatively rapidly along the scale.

The preferred form of the invention and its objects and advantages will be fully understood from the following description when read in connection with the accompanying drawings in which:

Fig. 1 is a perspective view of a range finder incorporating a simple form of the present invention. Fig. 1A shows the view through the eyepiece of the range finder illustrated in Fig. 1.

Fig. 2 is a plan view partly in section of the range finder whose optical system is shown in Fig. 1.

Fig. 3 shows an alternative arrangement for one detail of the finder shown in Figs. 1 and 2.

Fig. 4 is a perspective view of another embodiment of the invention. Fig. 4A is a view through the eyepiece of this embodiment.

Fig. 5 is a plan view of the embodiment shown in Fig. 4.

Figs. 6 and 7 are respectively perspective and plan views of an alternative arrangement for one detail of Figs. 4 and 5.

Fig. 12 is a perspective view of a preferred embodiment of the invention, Fig. 12A being a view through the eyepiece of this embodiment.

Fig. 13 is a plan view of one detail of the arrangement shown in Fig. 12.

Figure 8:
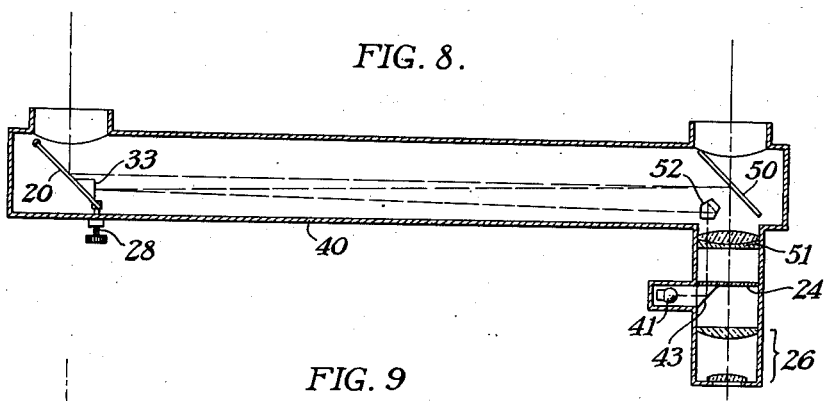
Figs. 8, 9, 10 and 11 are plan views of other embodiments of the invention.

In Fig. 1 the object being ranged is assumed to be an aeroplane which is at a great distance but for convenience is represented by two small planes immediately in front of each window respectively of the instrument. Light beams from this object are reflected respectively by mirror 20 and semi-transparent mirror 21 through an objective 22 and an erecting prism 23 to form superimposed images 25, as seen in Fig. 1A, in a comparison plane which is on one surface of a disk 24. By means of an eyepiece 26 these images are viewed by the eye 27 of an observer. By a nut and driving screw 28 the mirror 20 may be rotated about a pivot 29, as shown in Fig. 2, to move one of the images 25 relative to the other to bring them into coincidence.

According to the invention, light from a lamp 30 is reflected by a prism 31 past an index engraved on the disk 24, through the erecting prism 23 and the objective 22 to form a collimated beam 32. This beam is reflected from the front surface 33 of a prism cemented to the mirror 20 to form therewith an integral reflecting unit. The reflected beam 34 then strikes a dove prism 35 similarly cemented to the mirror 21 and as shown by the ray 36 enters the objective 22 to be brought to focus forming an element image 37 which acts as an index to be read against the scale 38 engraved on the disk 24. The dove prism 35 may intercept either the returning beam 34 as shown or the outgoing beam 32, the calibration of the scale 38 being determined by whichever arrangement is used. It will be noted that the element image 37 and the scale 38 are visible in the eyepiece field and that the scale 38 is integrally connected to the index which is behind the prism 31 on the disk 24.

In Fig. 2 this optical system is shown mounted in a housing 40.

In Fig. 3 the mirror 20 and prism 33 are replaced by a single large prism 39 whose front surface 39' reflects the range indicating element beam and whose hypotenuse surface reflects the beam from the object being ranged.

The embodiment shown in Figs. 4, 4A and 5 differs from that shown in Figs. 1 and 2 by having an oblique index 42 and a scale 45 which consists of points on a straight line. The index 42 is illuminated by a lamp 41 and the light therefrom is reflected by a prism 43 into the erecting prism 23 and thence through the optical system back into focus forming an image 44 in the comparison plane which image falls across the scale 45 at an acute angle less than 45°. As the index image 44 moves laterally a slight amount, the point at which it intersects the scale 45 moves relatively rapidly along this scale. Thus this form of the invention provides increased sensitivity and increased ease of reading and is useful with other forms of the broad invention described in Case A.

The embodiment shown in Figs. 4 and 5 has the elements 42, 43 and 24 separated from each other for clarity, but in practice it is preferable to have these as a single unit as illustrated in Figs. 6 and 7. In these latter two figures the prism 43' is cemented to the erecting prism 23, the oblique index 42' being engraved on one of the cemented surfaces. Similarly, the scale 45' is engraved on the surface of the erecting prism 23 which is located so that this surface is the comparison plane of the instrument, thus eliminating the need for the disk 24.

In Fig. 8 the light in one object beam is reflected twice before entering the objective 51 once by the mirror 20 and once by a semi-transparent mirror 50, the light in the other beam passing directly through the semi-transparent mirror 50. These two aligned beams are then brought to focus by the objective 51 in a comparison plane 24. Light from the index is reflected by a penta-prism 52 to the surface 33 and thence back to the reflector 50 so that it is reflected once as required at each of the reflectors.

Figure 9:
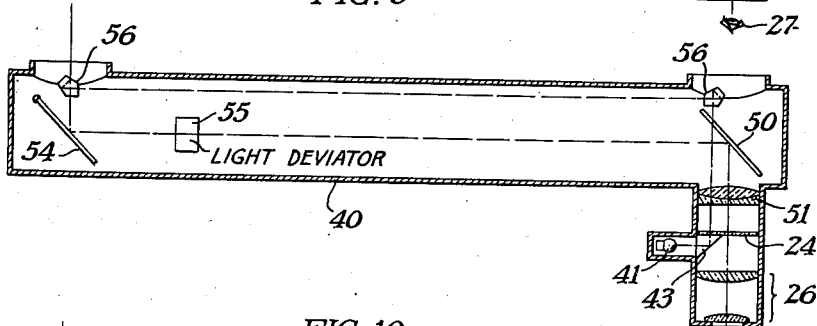

In Fig. 9 the mirror 20 of Fig. 8 is replaced by a stationary mirror 54 and a light deviating devise 55 which may have any of the standard forms. The light from the index is reflected from one window vicinity to the other by penta-prisms 56 and is then reflected once as required by each of the object beam reflectors 54 and 50 through the objective 51 into focus in the comparison plane 24.

Figure 10:
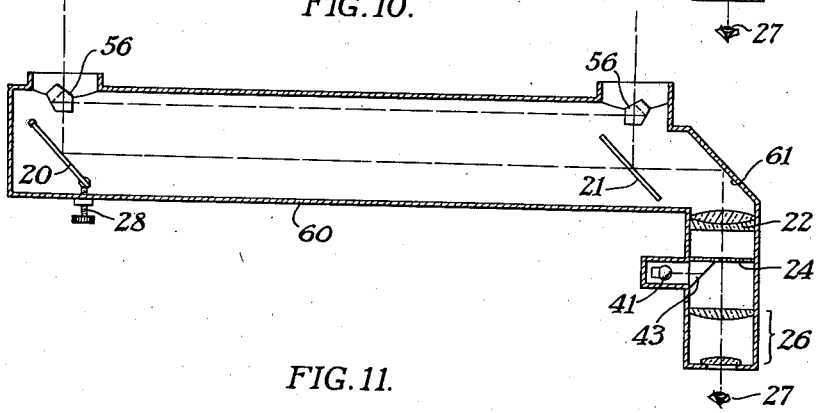

In Fig. 10 the penta-prisms 56 are used with the simple form of reflectors 20 and 21, but the housing 60 is modified to include a reflecting surface 61 so that although both beams when aligned go laterally away from the reflector 21 they are reflected once before entering the objective 22.

Figure 11:
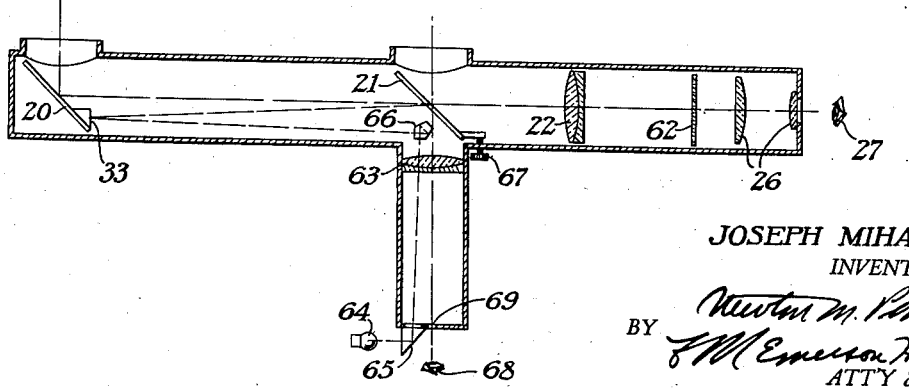

Fig. 11 shows still another form of the invention which employs two observers, the additional one reading the range. Light from a lamp 64 is reflected by a prism 65 to illuminate the index and to be collimated by an auxiliary lens 63. The collimated beam is reflected by a penta-prism 66 and then by the surface 33 and the mirror 21 back through the objective 63 to be brought to focus against a scale 69 to be read by the eye 68 of the extra observer. Such an arrangement is not strictly a short base range finder but is illustrated to show an alternative form of the invention. In this form the two aligned beams are focused by the objective 22 in a comparison plane 62 so that the eye 27 of the main observer sees the object images.

Figs. 8 to 11 show embodiments which are somewhat more complicated than those shown in the other figures and hence are less preferable.

In Figs. 12, 12A and 13 the scale and index are replaced by more complicated adjustment coindicant elements consisting of a spiral coincidence line 76 and fiducial marks 80. In this arrangement the mirror 20 is rotated by a cam 75 mounted on the end of a shaft 74 which is in turn rotated by a cam follower 73 and a cam 72 mounted on a shaft 71.

For clarity, suppose the coincidence were first obtained by operating this mirror 20 and then the disk 70 carrying the spiral coincidence line 76, were separately rotated until the image 76' falls between the fiducial marks 80. A scale 77 engraved adjacent to the spiral 76 could then be read directly using the fiducial marks 80 as an index or a separate scale and index could be provided on the disk 70 to be read by a different observer.

However, for convenience this disk 70 is also mounted on the shaft 71 to rotate with the cam 72 and to keep the coincidence line image 76' always between the fiducial marks 80 so that the scale may be read directly. If the optical system were to suffer maladjustment, the image 76' would no longer fall between the marks 80 and the scale reading would be incorrect, but this would be immediately apparent to the observer whose eye 27 is shown. Anything which corrects for this maladjustment and brings the coincidence line 76' back between the fiducial marks 80 would, of course, cause the scale reading to be correct. For example, the disk 70 might be separately rotated, but in the arrangement shown this compensation is provided by a nut 82 and a driving screw 81 mounted to rotate the mirror 21. In practice rotation of the cam 72 to bring the two object images into coincidence rotates the scale 77 to be read directly in the eyepiece. Only in those relatively rare instances when the instrument gets out of adjustment during taking of a reading, is it necessary to make any other adjustment. Even then, by using both hands, the observer makes this adjustment at the same time as he brings the object image into coincidence. If the line 76' moves out from between the marks 80, the observer brings it back and thus automatically corrects the instrument by rotating the screw 81. This embodiment is more fully described in Case F of this series of applications.

Having thus described the preferred embodiments of my invention, I wish to point out that it is not limited to these structures but is of the scope of the appended claims.

What I claim and desire to secure by Letters Patent of the United States is:

1. A range finder comprising a housing with two spaced windows in the front thereof, a reflecting system including reflectors behind each window for receiving light beams through the two windows and directing them into alignment going radially away from one of the reflectors, an objective in the housing for receiving the aligned beams and for forming in a comparison field two images of the object being ranged and means for deviating one beam relative to the other for adjusting the register of the two images, said range finder being characterized by a pair of adjustment coindicant elements and means for receiving light from one of the elements, for reflecting it at least once at each reflector and for focusing it to form an image of said one element adjacent to the other element, said deviating means also deviating said element image relative to said other element.

2. A range finder according to claim 1 in which every part of the light receiving and directing means deviates the light from the object and said light from one of the elements correspondingly and with equal rates of change of direction.

3. A range finder according to claim 1 in which the elements are at least optically in the comparison field and the element light beam receiving, reflecting and focusing means includes said objective.

4. A range finder according to claim 1 in which the elements are an index and a scale.

5. A range finder according to claim 1 in which both elements are on one surface of an erecting prism between the objective and the comparison plane which is at said surface.

6. A range finder according to claim 1 in which the reflector other than said one of the reflectors includes two reflecting surfaces approximately at 45° one to reflect the light from the object and the other for reflecting the element light beam.

7. A range finder according to claim 1 in which said one of the reflectors includes a dove prism for reflecting the element light beam.

8. A range finder according to claim 1 in which said elements are a line index and a scale which has points on a line, in which said element image line is at an angle less than 45° to the other element line adjacent to said element image, and in which the movement of the element image is in a direction approximately at right angles to itself.

9. A range finder comprising a housing with two spaced windows in the front thereof, reflectors behind each window for producing two aligned light beams going radially away from one of the reflectors, an objective in the housing for receiving the two beams and for forming in a comparison field two images of the object being ranged and light deviating means for adjusting the register of the two images, said range finder being characterized by a pair of adjustment coindicant elements at least optically in the comparison field and an optical system, including an auxiliary reflecting surface at each reflector for receiving light from one element through the objective and for reflecting it from one reflector to the other and back through the objective into focus forming an image adjacent to the other element, said system also including the light deviating means for adjusting the element image relative to the other element simultaneously with the register adjustment.

10. A range finder according to claim 9 in which the beam of light through each window is reflected by the corresponding reflector and the aligned beams are directed radially away from both reflectors.

11. A range finder according to claim 9 in which the beam of light through one window unreflectedly forms one of the aligned beams and the beam through the other window is reflected by each reflector into the alignment.

12. A range finder according to claim 9 in which the elements are an index and a scale.

13. A range finder according to claim 9 including a lamp for illuminating said one element.

14. A range finder according to claim 9 in which the elements are integrally attached to one another.

15. A range finder according to claim 9 in which an erecting prism is included between the objective and the comparison field.

16. A range finder according to claim 9 in which an erecting prism is included with one surface in the comparison field and in which the scale and index are on said surface.

17. A range finder according to claim 9 in which is included a transparent element having a flat surface in the comparison field and in which the scale and index are on said surface.

18. A range finder according to claim 9 in which the light deviating means consists of means for angularly adjusting one of the reflectors including its auxiliary reflecting surface.

19. A range finder according to claim 9 in which the reflector farther from the objective includes two reflecting surfaces substantially at 45° to one another, one to receive light from the object, the other to receive light through the objective from said one element and both to reflect light approximately toward the other reflector.

20. A range finder according to claim 9 in which the reflector nearer the objective includes a dove prism cemented to a semi-transparent mirror, with their reflecting surfaces substantially at 45° to one another, the mirror surface to receive light from the object, the dove prism to reflect the element light beam once as it passes from one reflector to the other.

21. A range finder according to claim 9 in which said elements are a line index and a scale which has points on a line, in which said element image line is at an angle less than 45° to the other element line adjacent to said element image, and in which the movement of the element image is in a direction approximately at right angles to itself.

22. A range finder of the type having a housing with two spaced windows in the front thereof, means for viewing from the outside a comparison plane in the housing and an optical system including reflecting devices behind each window for producing two aligned beams going radially from both devices and one objective for forming in the comparison plane with said aligned light beams, two images of the object being ranged and light deviating means for adjusting one image relative to the other, said range finder being characterized by each reflecting device having two reflecting surfaces substantially at 45° to each other only one of which reflects the object beam coming through the adjacent window and by comprising a scale and index constituting adjustment coindicant elements, each at least optically in the comparison plane and both visible through the viewing means, one substantially directly and the other via a real image thereof formed by light passing from said other element through the objective, being collimated thereby and being reflected once by the other reflecting surface of each reflecting device and back through the objective into focus adjacent to said one element.

23. A range finder according to claim 22 including means for illuminating said other element with light directed toward the objective and means for directly screening said illuminating means from the viewing means.

24. A range finder according to claim 22 in which the light deviating means consists of means for angularly adjusting one of the reflecting devices for simultaneously deviating the object beam coming through the adjacent window and the element light beam.

25. A range finder according to claim 22 including an erecting prism adjacent to said comparison field, said scale and index being integrally attached to said erecting prism.

26. A range finder according to claim 22 in which the scale and index are integrally attached to one another.

27. A range finder according to claim 22 in which is included a transparent element having a flat surface in the comparison plane and in which the scale and index are on said surface.

28. In a range finder of the type having scale and index adjustment coindicant elements and having an image of one of these elements formed adjacent to the other element by light passing through at least the equivalent of the optical system which forms the comparison images of the range finder, the subcombination which consists of said index being a long line, said scale being points on a line, the element image line being at an angle less than 45° to the other element line and the adjustment of the element image being in a direction approximately at right angles to its line.

29. The subcombination according to claim 28 in which both element lines are straight.

JOSEPH MIHALYI.